United States Patent
Chauhan et al.

(10) Patent No.: US 9,760,384 B1
(45) Date of Patent: *Sep. 12, 2017

(54) METHOD TO SUPPORT MULTIPLE VERSIONS OF APIS AND TO CONTROL RUN-TIME EXECUTION OF AN API

(71) Applicant: International Business Machines Corporation, Armonk, NY (US)

(72) Inventors: Keerti S. Chauhan, Bangalore (IN); Pawan K. Chawdhary, Bangalore (IN); Shunmuga Raja Periadurai, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/414,670

(22) Filed: Jan. 25, 2017

Related U.S. Application Data

(63) Continuation of application No. 15/185,055, filed on Jun. 17, 2016.

(51) Int. Cl.
*G06F 9/44* (2006.01)
*G06F 9/445* (2006.01)
*G06F 9/54* (2006.01)

(52) U.S. Cl.
CPC .......... *G06F 9/44536* (2013.01); *G06F 9/541* (2013.01)

(58) Field of Classification Search
CPC ............................... G06F 9/44536; G06F 9/541
USPC .......................................................... 717/106
See application file for complete search history.

(56) References Cited

U.S. PATENT DOCUMENTS

| | | | | |
|---|---|---|---|---|
| 6,842,904 | B1* | 1/2005 | Bartz | G06F 8/60 707/999.202 |
| 7,610,316 | B2* | 10/2009 | Bartz | G06F 8/60 |
| 7,818,759 | B2* | 10/2010 | Ahmed | G06F 9/54 719/328 |
| 7,873,958 | B2* | 1/2011 | Wiltamuth | G06F 8/71 707/690 |
| 8,001,523 | B1* | 8/2011 | Wiltamuth | G06F 8/36 717/108 |
| 9,075,596 | B2* | 7/2015 | Tseitlin | |
| 9,262,237 | B2* | 2/2016 | Gopalraj | G06F 9/541 |
| 9,529,579 | B2* | 12/2016 | Brunet | G06F 8/65 |
| 2005/0034137 | A1* | 2/2005 | Bartz | G06F 8/60 719/328 |
| 2014/0019993 | A1* | 1/2014 | Mathur | G06F 9/54 719/313 |

(Continued)

OTHER PUBLICATIONS

Chauhan et al, "Method to Support Multiple Versions of APIs and to Control Run-Time Execution of an API", U.S. Appl. No. 15/185,055, filed Jun. 17, 2016, 26 pages.

(Continued)

*Primary Examiner* — Marina Lee
(74) *Attorney, Agent, or Firm* — Gilbert Harmon, Jr.

(57) ABSTRACT

In an approach to API versioning, annotations are provided to differentiate among two or more versions of an API. Statistics associated with the two or more versions of the API are collected. A call from a client to access one of the two or more versions of the API is intercepted. A best-fit version for the client is identified based on employing analytical elements on the collected statistics. API execution is re-routed to the identified best-fit version during run-time.

1 Claim, 4 Drawing Sheets

(56) References Cited

U.S. PATENT DOCUMENTS

2015/0128126 A1*  5/2015  Brunet .................... G06F 8/65
                                                       717/172
2015/0169386 A1*  6/2015  Gopalraj ................ G06F 9/541
                                                       719/328

OTHER PUBLICATIONS

IBM Appendix P, list of patents or patent applications treated as related, Jan. 2017, 2 pages.

* cited by examiner

| API GROUP | API NAME | API VERSION REFERENCE | CURRENTLY INVOKED API | PARAMETER CONSTRUCTOR CLASS (OPTIONAL) |
|---|---|---|---|---|
| SERVICE INVOICE LINE ITEM PROCESSING | Payments/Financials. doSILIProcess | OLD API | TRUE | |
| | Payments/Financials. doSILIProcess | NEW API | FALSE | |

FIG. 2

| METHOD VERSION | CUSTOMER | STABILITY (0.1-1.0) | EXECUTION TIME (ms) | ACCURACY (0.1-1.0) |
|---|---|---|---|---|
| 1 | C-1 | 3 | 0.5 | 4 |
| 1 | C-2 | 3 | 0.4 | 4 |
| 2 | C-3 | 4 | 0.8 | 3 |
| 2 | C-4 | 3 | 0.7 | 3 |

FIG. 3

METHOD TO SUPPORT MULTIPLE VERSIONS OF APIS AND TO CONTROL RUN-TIME EXECUTION OF AN API

TECHNICAL FIELD OF THE INVENTION

The present disclosure relates generally to software development, and more particularly to methods and systems for identifying a best-fit Application Programming Interface (API) for a client.

BACKGROUND OF THE INVENTION

In computer programming, an API provides building blocks for the development of software and applications.

By analogy to a real-world behavior, an API may continuously evolve based on several parameters such as need, environment, and dependencies with systems. Different versions of an API may be appropriate to different clients based on, for example but without limitation, the needs of the client in terms of execution time or accuracy, or the client's particular data model.

In an exemplary case, in the payments and financials domain, two versions of a Service Invoice Line Item (SILI) API could be configured differently for execution. One version may initially function well for two different clients with similar data models, but over time, one client's data model may evolve, causing performance problems and necessitating a switch from the first version of the SILI API to the second version.

SUMMARY

According to one embodiment of the present invention, a computer-implemented method for API versioning, the method comprising: providing, by one or more computer processors, annotations differentiating two or more versions of an API wherein the annotations are implemented in the form of a programming language extension; collecting, by the one or more computer processors, statistics associated with the two or more versions of the API wherein the collected statistics comprise version-specific information related to one or more of stability, execution time, and accuracy experienced by customers using the API; intercepting, by the one or more computer processors, a call from a client to access one of the two or more versions of the API wherein the call from the client comprises a call to access a previously selected default version and the call is intercepted responsive to detection of a performance problem comprising: receiving, by the one or more computer processors, a user selection prioritizing a parameter; analyzing, by the one or more computer processors, the collected statistics; and determining, by the one or more computer processors, that performance is poor with respect to the prioritized parameter; and identifying, by the one or more computer processors, a best-fit version for the client based on employing analytical elements on the collected statistics comprising: receiving, by the one or more computer processors, from the client, a selected parameter; and searching, by the one or more computer processors, for the selected parameter in a statistics repository; and re-routing, by one or more computer processors, API execution to the identified best-fit version during run-time.

BRIEF DESCRIPTION OF THE DRAWINGS

FIG. 2 is a table of exemplary API version information maintained in accordance with an embodiment of the present invention;

FIG. 3 is a table of exemplary statistics monitored in accordance with an embodiment of the present invention;

DETAILED DESCRIPTION

Figure 1:
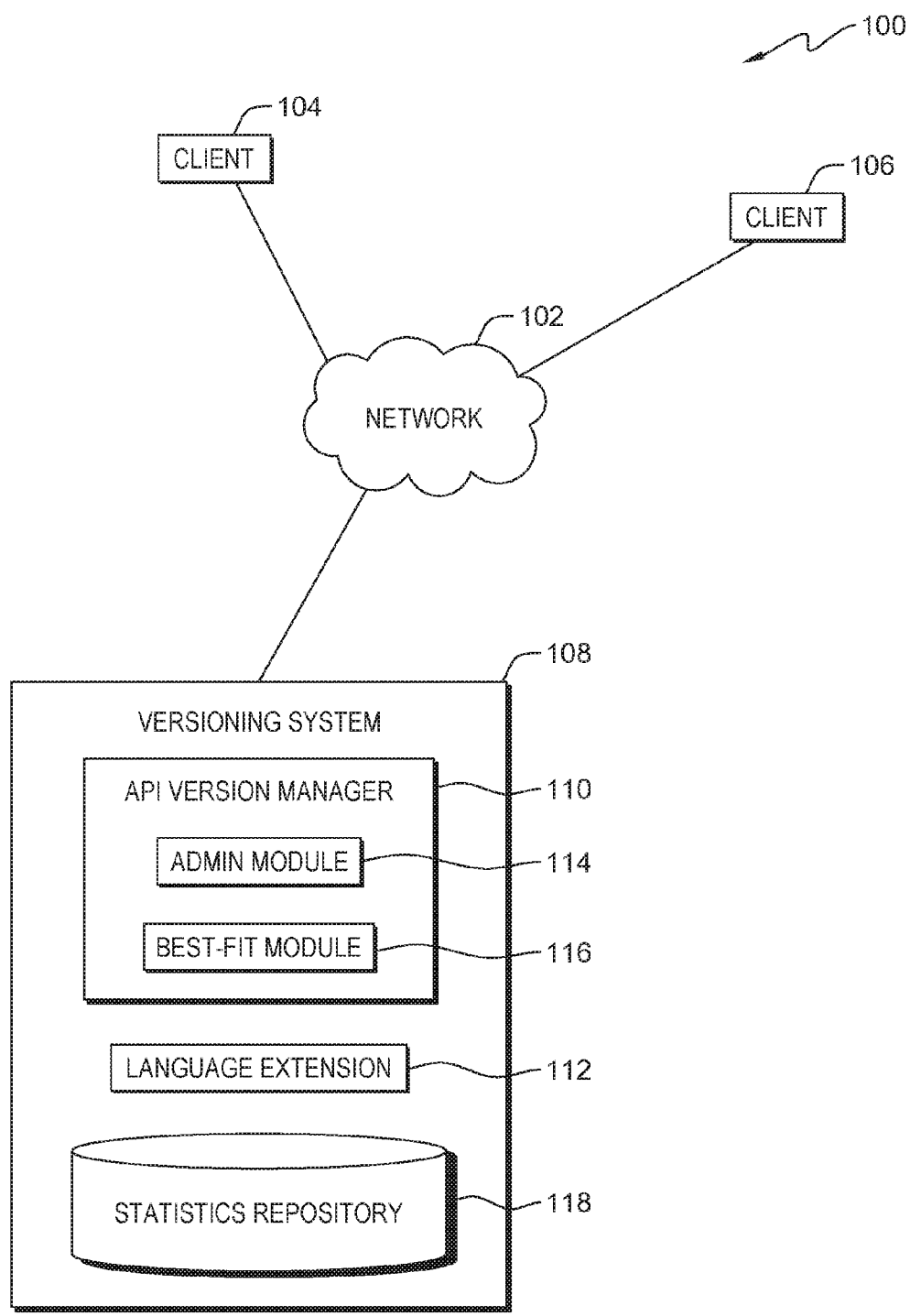
FIG. 1 is a block diagram of an exemplary computing environment, in accordance with an embodiment of the present invention.

Embodiments described herein provide methods, computer program products, and/or computer systems that enable provision of multiple versions of an API to a varied set of clients based on providing annotations to differentiate among API versions (or simply "versions") and using client (or "customer") statistics to determine a best-fit API at run-time.

Embodiments of the present invention may recognize one or more of the following facts, potential problems, potential scenarios, and/or potential areas for improvement with respect to the current state of the art: (i) one customer experiences performance problems when using a particular version of an API, but a different customer does not experience performance problems using the same version, due to differences in the customers' respective data models (e.g., the structure of the customers' data); (ii) a customer wishes to switch back from using a newer version of an API to using an older version, and this requires bringing down an application and making code changes; and/or (iii) management of a growing number of API versions becomes problematic.

Embodiments of the present invention may include one or more of the following features, characteristics, and/or advantages: (i) different versions of the same API are made available to different customers, depending on customer preferences; (ii) different versions of an API offer different advantages, e.g., one is the most stable, another provides the best execution time, and another offers the greatest accuracy; (iii) APIs are mapped and re-routed at run-time based on parameters related to customer environment; (iv) programming language support is extended to provide annotation-based (e.g., metadata) version identifiers; (v) support is provided at the infrastructure level, so that applications naturally inherit the advantages of API versioning and re-writes on the application layer are avoided; (vi) code changes at the application layer are avoided if different versions of an API accept the same number of parameters (where 'execution time' would be a non-limiting example of a parameter), the parameters are of the same data type, and the different versions of the API provide the same return type; and/or (vii) switching between API versions occurs automatically, without need to restart a running application.

Embodiments of the present invention may recognize one or more of the following usage scenarios: (i) a new API is written to complement an old API, if the old API causes performance problems, but the old API is retained and tagged with a version indicator to differentiate it from the new API; (ii) an API fails because of external dependencies (e.g., for business reasons, for technical reasons), resulting in errors, and one or more versions without the same external dependencies are made available automatically, providing a fallback chain; (iii) if a version of an API is deprecated and an alternative version is indicated, calls can be re-routed automatically to the alternative version; and/or (iv) based on statistical information related to customer usage of different versions of an API, the correct API for a particular customer environment is automatically recognized.

Embodiments of the present invention are described herein with reference to the Figures. FIG. 1 shows a block diagram of a computing environment 100, in accordance with an embodiment of the present invention. FIG. 1 is provided for the purposes of illustration and does not imply any limitations with regard to the environments in which different embodiments can be implemented. Many modifications to the depicted environment can be made by those skilled in the art without departing from the scope of the invention as recited in the claims.

Computing environment 100 includes clients 104-106 and versioning system 108, which can be interconnected with other devices (not shown) over network 102. Network 102 can be, for example, a telecommunications network, a local area network (LAN), a wide area network (WAN), such as the Internet, or a combination of these, and can include wired, wireless, or fiber optic connections. In general, network 102 can be any combination of connections and protocols that will support communications between clients 104-106, versioning system 108, and other computing devices (not shown) within computing environment 100.

Clients 104-106 represent a variable number of clients that may operate in varying environments (or "customer environments") and require one or more APIs (not illustrated). A customer environment may be defined by, for example but without limitation, a data model, and may evolve over time to become incompatible with a particular API.

Versioning system 108 provides support to clients 104-106 for automatic and/or manual switching between versions of an API. Versioning system 108 includes API version manager 110, language extension 112, admin module 114, best-fit module 116, and statistics repository 118. Versioning system 108 can include internal and external hardware components, as depicted and described in further detail with reference to FIG. 5.

API version manager 110 provides support for API versioning, such as but not limited to defining different versions of an API by application code, maintaining a list of available API versions in a stored document, and facilitating switching between different API versions at run-time. In a non-limiting example, switching may occur responsive to a manual change, e.g., by an administrator via admin module 114 (described herein). In another non-limiting example, switching may occur automatically, responsive to detection of a performance problem (e.g., poor execution time) based on analysis of collected statistics, as described herein with reference to FIGS. 3 and 4.

Language extension 112 adds infrastructural support to a programming language in the form of annotation-based version identifiers. In a non-limiting embodiment based on Java, Java Annotations can be used to provide metadata information that differentiates API versions.

Admin module 114 manages available versions of an API, for example but without limitation, providing functions for dynamically switching between versions of the API at run-time.

In a non-limiting example of manual switching via admin module 114, an administrator may prompt re-routing of API calls from a currently invoked version to a second version. The currently invoked version may be a previously selected default version. If the currently invoked version and the second version respectively interface with first and second external systems, and the administrator becomes aware of expected maintenance activities that will take down the first external system, the administrator may log in and update stored invocation information to select the second version, and publish the update in order to prompt re-routing to the second version.

Best-fit module 116 monitors invocations of API versions and statistics regarding those versions and their use by various customers. Based on collected statistics (e.g., performance information) stored in statistics repository 118, best-fit module 116 may, for example, identify a best-performing version. Exemplary statistics are described herein with reference to FIG. 3.

FIG. 2 shows a table 200 of exemplary information that may be maintained by API version manager 110. Table 200 shows type ("API Group"), name, reference ("Old API," "New API"), invocation ("True," "False"), and parameter constructor class information for versions of an exemplary API, Payments/Financials.doSILIProcess.

In an embodiment, a parameter constructor feature may enable customization of the construction of parameters supplied to the API before invocation is switched from a currently invoked version to a second version. For example, if parameter 'A' is a composite object having attributes 'p, q, r', then customization of parameter construction may enable customization of parameter 'A' with new values for 'p, q, r' to be passed to the newly-invoked second version.

FIG. 3 shows a table 300 of exemplary run-time statistics that may be stored in statistics repository 118. Table 300 shows statistics related to stability, execution time, and accuracy of a first and second version (version 1 and version 2, respectively) of an API, which are in use by four different customers (customers C-1 to C-4).

In a non-limiting example based on table 300, a new customer (C-5, not represented) may invoke version 2 by default. In the same example, customer C-5 may experience poor execution time using version 2, where poor execution time may be defined as relatively long execution time in comparison with other versions. If customer C-5 previously made a selection prioritizing execution time, then best-fit module 116 may analyze statistics from table 300 to determine that version 1 is functioning well in terms of execution time and automatically switch the invocations to version 1.

Figure 4:
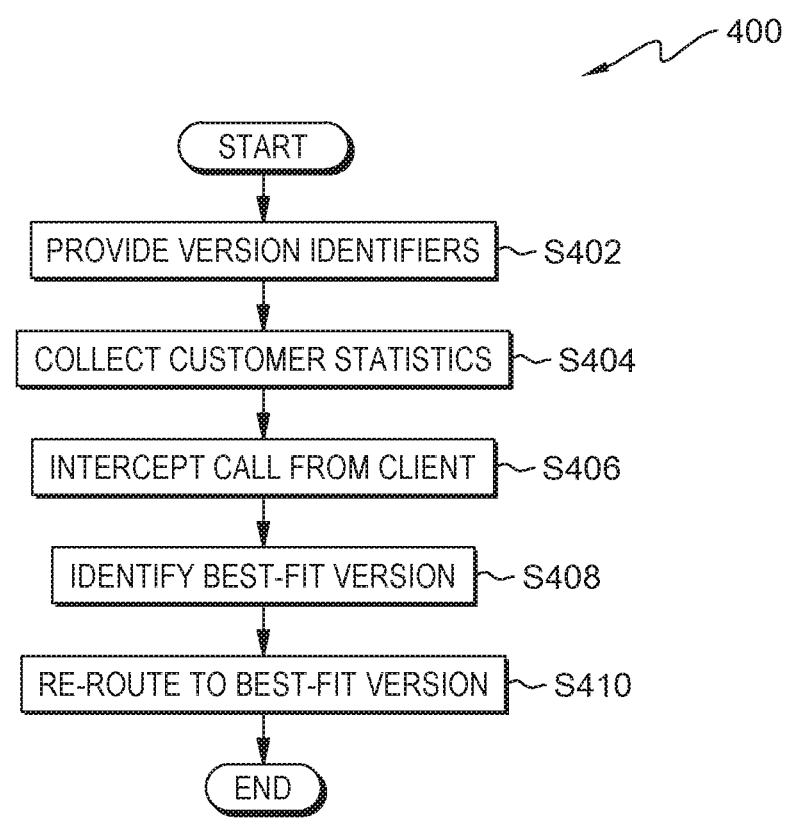
FIG. 4 is a flowchart depicting operational steps of an API versioning method, in accordance with an embodiment of the present invention.

FIG. 4 is a flowchart 400 depicting operational steps of an API versioning method, in accordance with an embodiment of the present invention.

In operation S402, language extension 112 provides version identifiers differentiating two or more versions of an API.

In operation S404, best-fit module 116 collects statistics associated with the two or more versions of the API and stores the collected statistics in statistics repository 118.

In operation S406, API version manager 110 intercepts a call from a client (e.g., client 104, client 106) to access one of the two or more versions of the API.

In operation S408, best-fit module 116 identifies a best-fit version for the client based on employing analytical elements on the collected statistics. In an embodiment, best-fit module 116 searches statistics repository 118 for a selected parameter (e.g., execution time) received from the client and identifies the version that is performing best in terms of the selected parameter.

In operation S410, admin module 114 re-routes execution of the API to the identified best-fit version.

Figure 5:
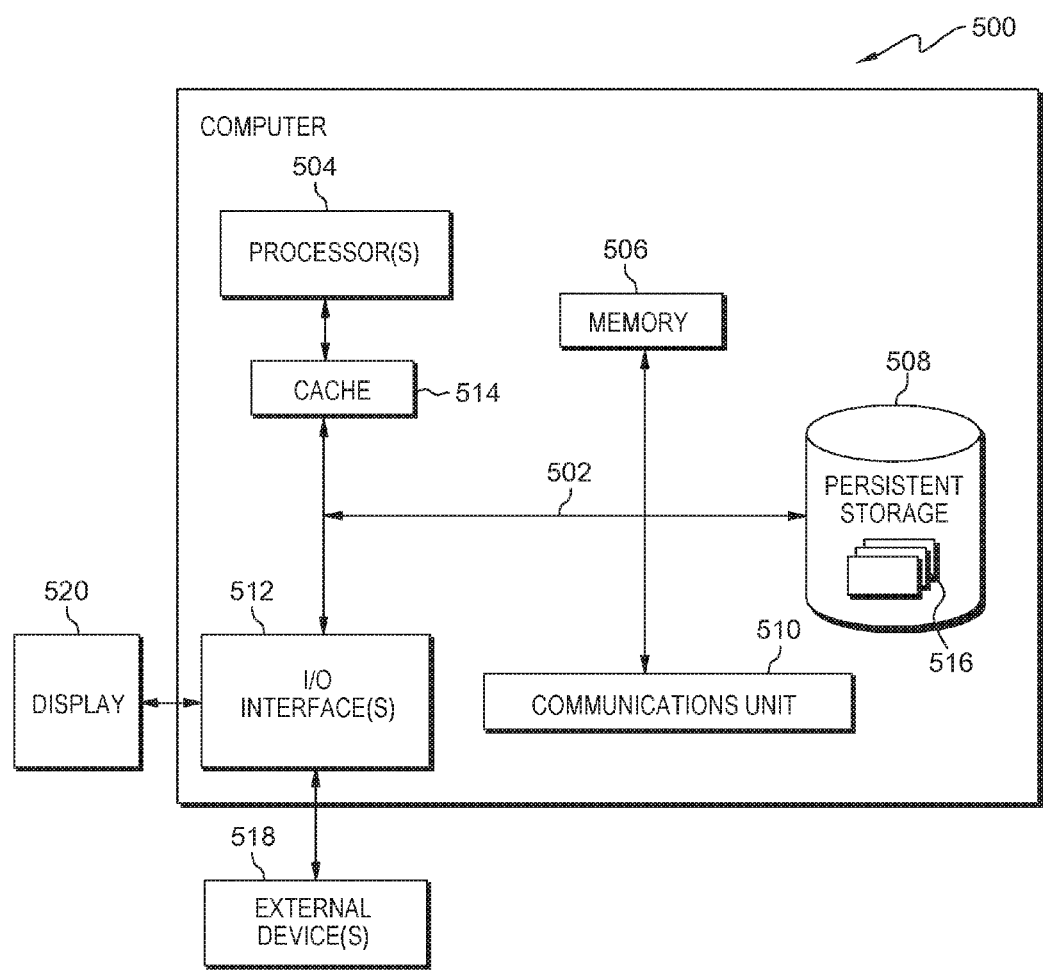
FIG. 5 is a block diagram of components of a computing device executing operations of an API versioning program, in accordance with an embodiment of the present invention.

FIG. 5 depicts a block diagram 500 of components of a computing device (e.g., versioning system 108) in computing environment 100, in accordance with illustrative embodiments of the present invention. It should be appreciated that FIG. 5 provides only an illustration of one implementation and does not imply any limitations with regard to the environments in which different embodiments may be implemented. Many modifications to the depicted environment may be made.

Block diagram 500 shows communications fabric 502, which provides communications between computer processor(s) 504, memory 506, persistent storage 508, communications unit 510, and input/output (I/O) interface(s) 512, and cache 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) and cache memory 514. In general, memory 506 can include any suitable volatile or non-volatile computer readable storage media. Cache 514 is a fast memory that enhances the performance of computer processor(s) 504 by holding recently accessed data, and data near accessed data, from memory 506.

Program instructions and data used to practice embodiments of the invention, referred to collectively as component(s) 516, are stored in persistent storage 508 for execution and/or access by one or more of the respective computer processors 504 via one or more memories of memory 406. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive can be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. Communications unit 510 can include one or more network interface cards. Communications unit 510 can provide communications through the use of either or both physical and wireless communications links. Component(s) 516 can be downloaded to persistent storage 508 through communications unit 510.

I/O interface(s) 512 allows for input and output of data with other devices that may be connected to versioning system 108. For example, I/O interface 512 can provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., component(s) 516, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a touchscreen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for Application Programming Interface (API) versioning, the method comprising:
   providing, by one or more computer processors, annotations differentiating two or more versions of an API wherein the annotations are implemented in the form of a programming language extension;
   collecting, by the one or more computer processors, statistics associated with the two or more versions of the API wherein the collected statistics comprise version-specific information related to one or more of stability, execution time, and accuracy experienced by customers using the API;
   intercepting, by the one or more computer processors, a call from a client to access one of the two or more versions of the API wherein the call from the client comprises a call to access a previously selected default version and the call is intercepted responsive to detection of a performance problem comprising:
      receiving, by the one or more computer processors, a user selection prioritizing a parameter;
      analyzing, by the one or more computer processors, the collected statistics; and
      determining, by the one or more computer processors, that performance is poor with respect to the prioritized parameter; and
   identifying, by the one or more computer processors, a best-fit version for the client based on employing analytical elements on the collected statistics comprising:
      receiving, by the one or more computer processors, from the client, a selected parameter; and
      searching, by the one or more computer processors, for the selected parameter in a statistics repository; and
   re-routing, by one or more computer processors, API execution to the identified best-fit version during runtime.

* * * * *